July 8, 1969  A. E. WEBER ET AL  3,454,064
PITTING AND SLICING APPARATUS
Filed Dec. 27, 1966  Sheet 1 of 3
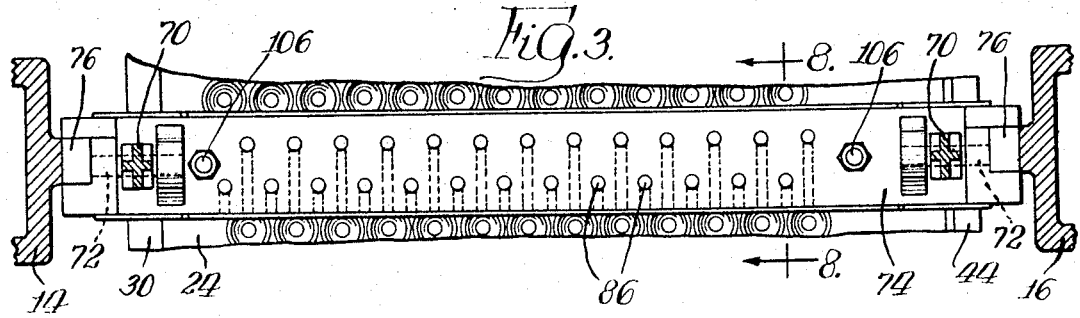
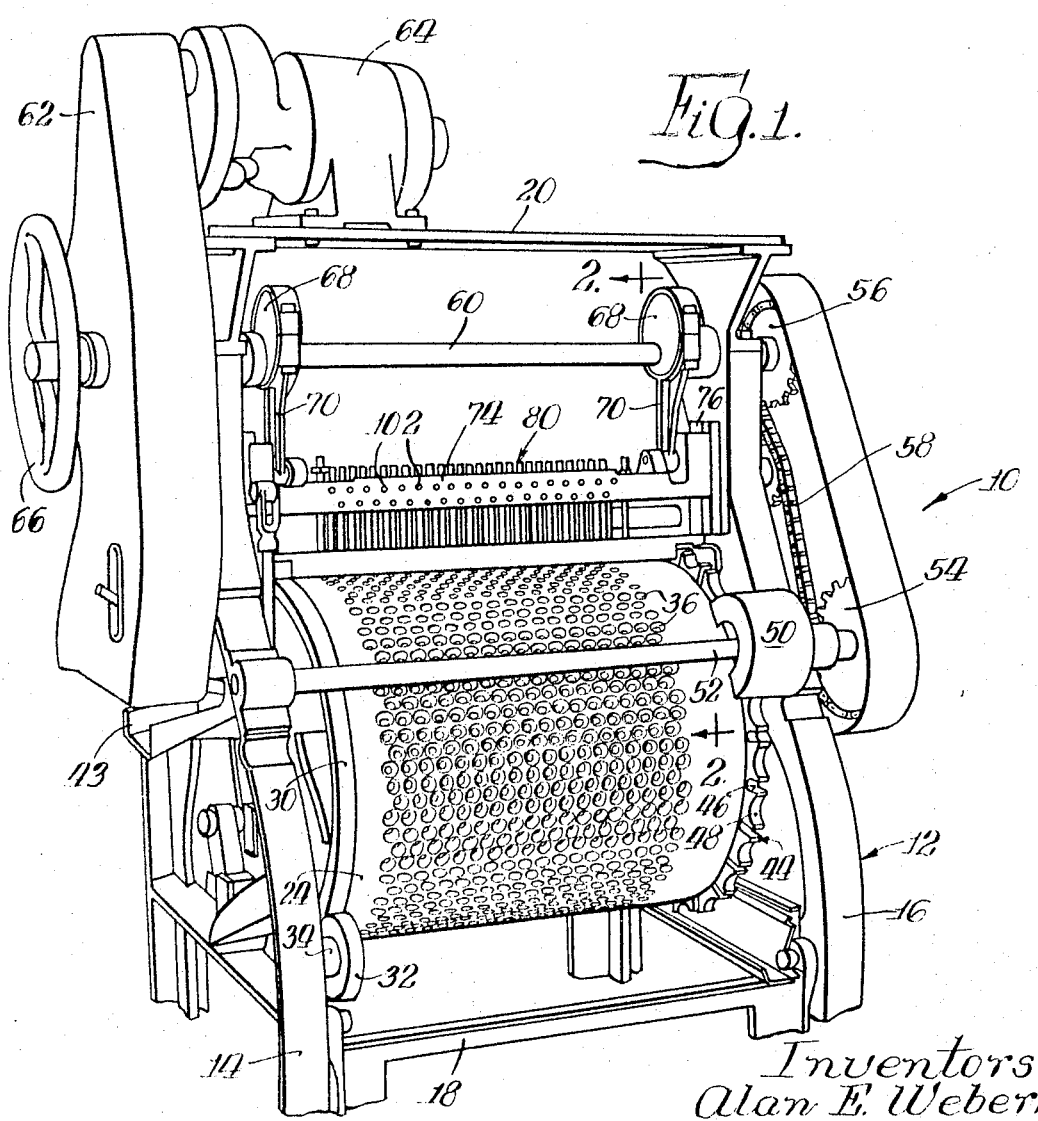
Inventors:-
Alan E. Weber,
Donald C. Gettys,
By Brown, Jackson,
Boettcher & Dienner  Attys

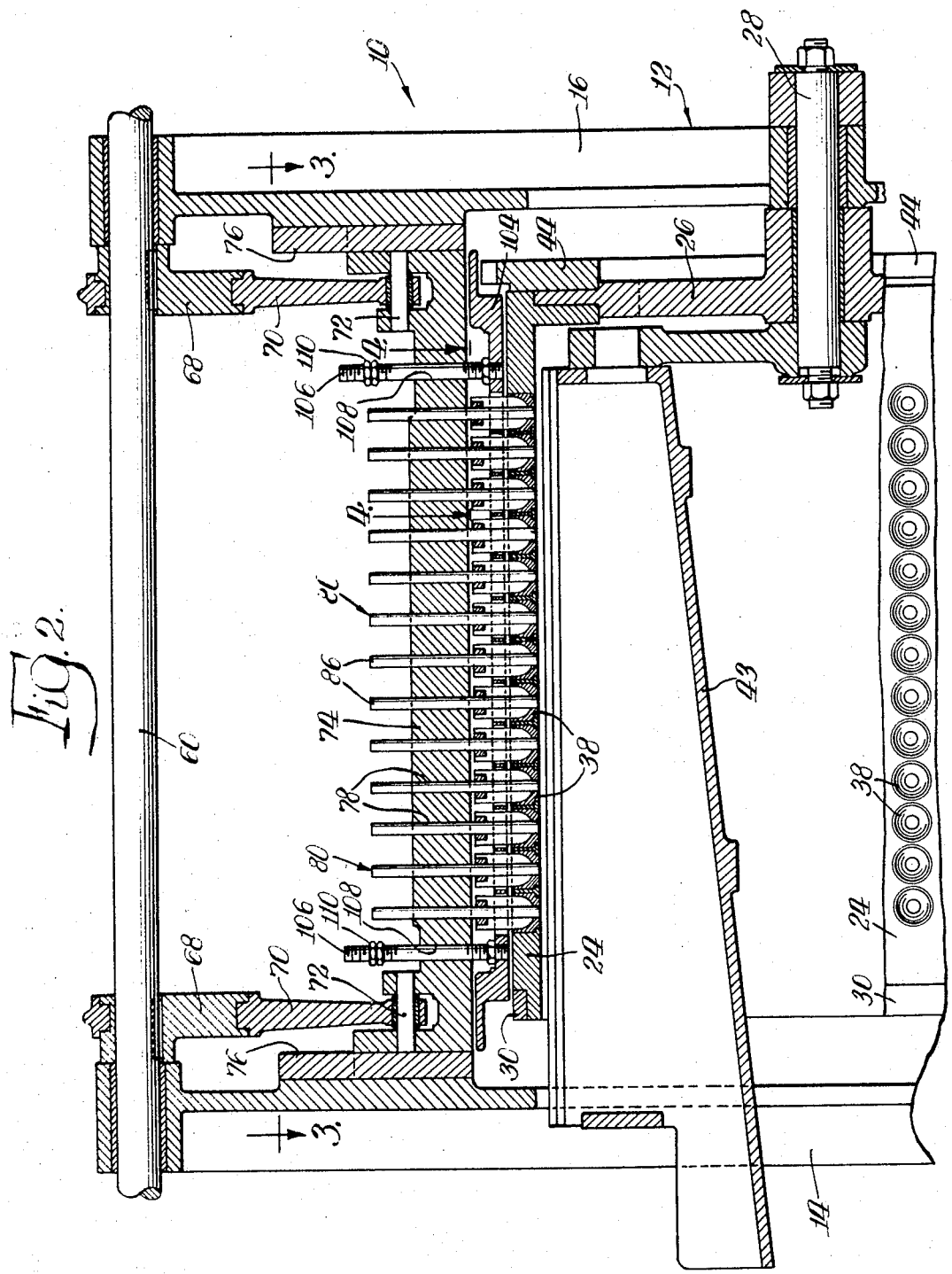

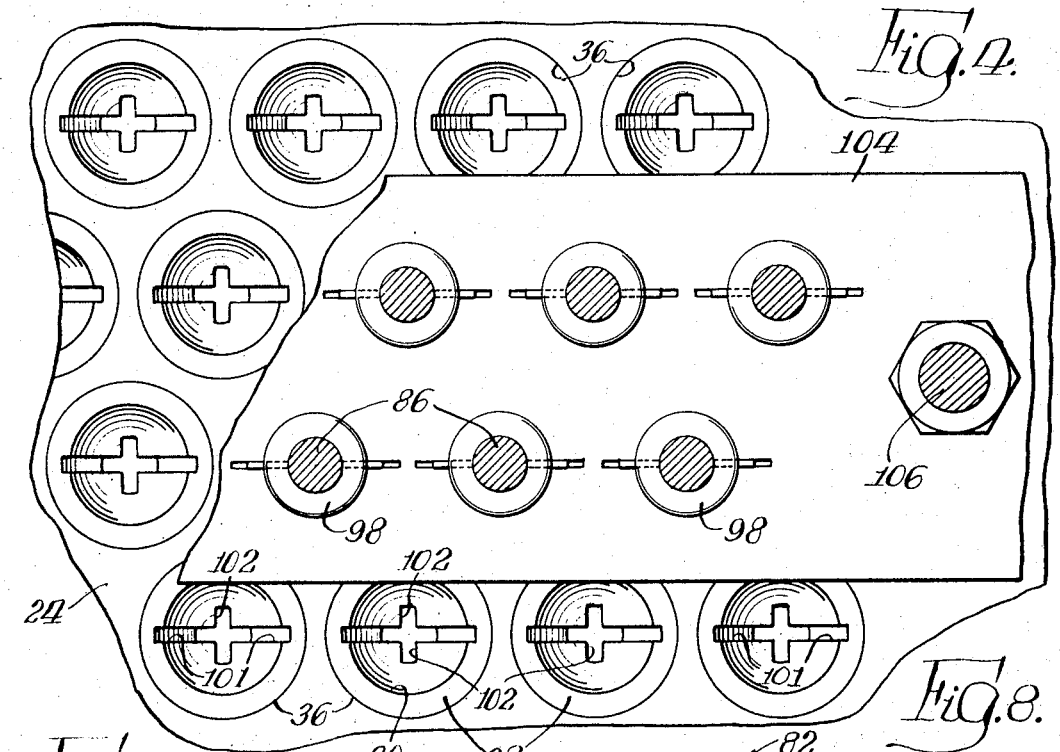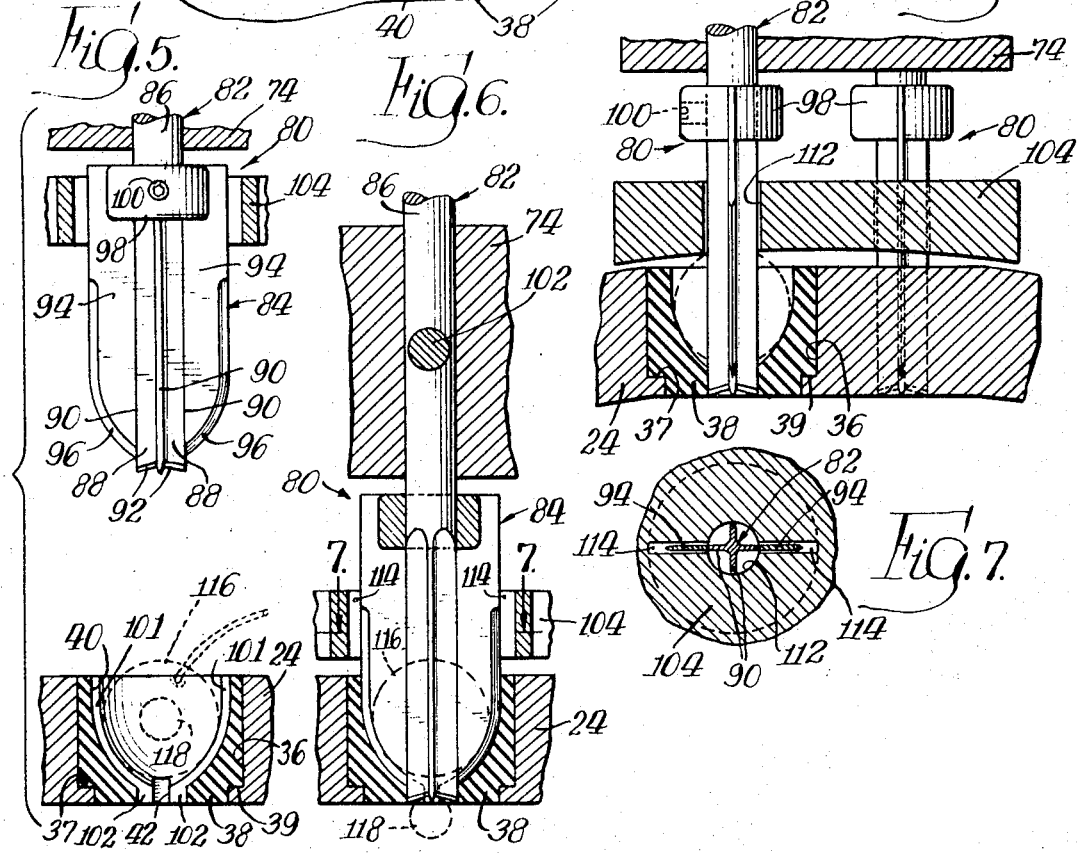

United States Patent Office 3,454,064
Patented July 8, 1969

---

3,454,064
PITTING AND SLICING APPARATUS
Alan E. Weber, Portage, and Donald C. Gettys, Galesburg, Mich., assignors to Libby, McNeill & Libby, Chicago, Ill., a corporation of Maine
Filed Dec. 27, 1966, Ser. No. 605,016
Int. Cl. A47j 23/00, 25/00; A23n 3/00
U.S. Cl. 146—19                                5 Claims Our present invention relates to apparatus for simultaneously pitting and slicing cherries and like fruit.

In general, the apparatus of our present invention comprises a rotatably mounted drum provided with rows of openings in which cherries are adapted to be supported, a plurality of combined pitting and slicing instruments each including a pitting needle and slicing blade means, and means for actuating the combined pitting and slicing instruments to force pits from the cherries while severing the same.

It is an object of our present invention to provide apparatus as described wherein resilient cups, each formed with a cavity to seat a cherry and with a pit discharging aperture, are mounted in the drum openings whereby to substantially eliminate undesirable tearing of the cherry during pitting and slicing.

It is another object of our present invention to provide apparatus as described wherein the resilient cups are removable so that resilient cups with cavities of different sizes may be interchangeably mounted in the drum openings to accommodate and firmly support cherries of different sizes in order to achieve optimum quality characteristics of the finished product.

It is a further object of our present invention to provide a combined pitting and slicing instrument as described wherein the slicing blade means is releasably secured to the pitting needle so that the slicing blade means may be adjusted longitudinally of the pitting needle to compensate for wear and sharpening of the cutting edges of the instrument.

Now in order to acquaint those skilled in the art with the manner of constructing and using pitting and slicing apparatus in accordance with the principles of our present invention, we shall describe in connection with the accompanying drawings a preferred embodiment of our invention.

In the drawings:

FIGURE 1 is a perspective view of the upper portion of a combined pitting and slicing machine incorporating the principles of our present invention;

FIGURE 2 is an enlarged view, taken substantially in the offset vertical planes of the arrows 2—2 in FIGURE 1;

FIGURE 3 is a fragmentary horizontal view, taken substantially along the line 3—3 in FIGURE 2, looking in the direction indicated by the arrows;

FIGURE 4 is a further enlarged fragmentary view, taken substantially along the line 4—4 in FIGURE 2, looking in the direction indicated by the arrows;

FIGURE 5 is a fragmentary vertical view illustrating a combined pitting and slicing instrument and a resilient cup aligned therebelow;

FIGURE 6 is a fragmentary vertical view illustrating a combined pitting and slicing instrument engaged with a resilient cup;

FIGURE 7 is a fragmentary horizontal view, taken substantially along the line 7—7 in FIGURE 6, looking in the direction indicated by the arrows; and FIGURE 8 is a fragmentary vertical view, taken substantially along the line 8—8 in FIGURE 3, looking in the direction indicated by the arrows.

Referring now to FIGURES 1 and 2, there is indicated generally by the reference numeral 10 a machine or apparatus, incorporating the principles of our present invention, for simultaneously pitting and slicing cherries and like fruit. The machine 10 includes a main frame 12 comprised of side frame members 14 and 16 interconnected by lower transverse frame means 18 and upper transverse frame member 20.

Rotatably mounted in the main frame 12 is a hollow drum 24. One end of the drum 24 is provided with a closed end wall 26 that is suitably journalled on a stub shaft 28 supported in the side frame member 16, while the other end of the drum 24, which is open, is provided with a rim 30 that is engaged and supported by a plurality of anti-friction rollers, one of which is indicated at 32. The rollers 32 are carried by pins 34 suitably secured to, and extending laterally inwardly from, the side frame member 14.

The hollow drum 24 is provided with a plurality of openings 36 through the periphery thereof. The openings 36 are arranged in rows, and the openings of adjacent rows are preferably staggered with respect to each other. Each opening 36 is formed with an internal annular shoulder 37 (FIGURE 5). Removably mounted in each opening 36 is a cup 38 fabricated of resilient material such as rubber. Each cup 38 is formed with an annular shoulder 39 that engages the drum shoulder 37, with a cavity 40 to seat a cherry and with a pit discharging aperture 42. Again referring to FIGURES 1 and 2, a stationary pit collecting and discharge trough 43 is mounted within the drum 24 and extends outwardly of the open end thereof.

The drum 24 is adapted to be driven with an intermittent rotary movement by means of a conventional Geneva mechanism. Such mechanism, which in itself does not form part of the present invention, includes a stop wheel 44 secured to the drum end wall 26. The wheel 44 has alternating notches 46 and curved surfaces 48 which are engaged by a pin and segment actuator enclosed by a shield 50 and secured to a transverse shaft 52 rotatably supported by the side frame members 14 and 16. The shaft 52 is drivingly connected, by means of sprockets 54 and 56 and a chain 58, with a transverse shaft 60 rotatably supported in the side frame members 14 and 16 adjacent the upper ends thereof. The shaft 60, in turn, is drivingly connected, by means of conventional power transmission means enclosed by a guard 62, with an electric motor 64 secured to the upper transverse frame member 20. In addition, a hand wheel 66 is secured to the end of the shaft 60 that projects through the guard 62.

Secured to the shaft 60, inwardly of the side frame members 14 and 16, are eccentrics 68 having associated therewith depending arm members 70 that are pivotally connected at their lower ends by pins 72, to a crosshead or needle bar 74 that is adapted to be vertically oscillated. The channeled ends of the crosshead 74 are slidingly guided on flanged members 76 secured to the side frame members 14 and 16. The crosshead 74 is provided with a plurality of vertical openings 78 in which are carried combined pitting and slicing instruments 80. The instruments 80 are arranged in two rows (FIGURES 3 and 4) for alignment with the two rows of resilient cups 38 immediately therebelow.

Each instrument 80, as shown in FIGURES 5–8, is comprised of a pitting needle 82 and slicing blade means 84. The pitting needle 82 has a longitudinally extending body portion 86 provided with alternate straight flutes 88 and narrow lands 90 extending to the lower end of the needle. Inwardly inclined cutting edges 92 are formed at the ends of the lands 90. The slicing blade means 84 is comprised of slicing blade sections 94 arranged on opposite sides of the pitting needle 82 in a plane intersecting the longitudinal axis of the needle. The lower ends of the blade sections 94 are convex, and cutting edges 96 are provided along the lower convex ends and a portion of the sides of the blade sections. The upper ends of the blade sections 94 are connected to a collar member 98 that is releasably secured, by means of a set screw 99, to the pitting needle 82 intermediate of the ends thereof. In normal assembly, the lower convex cutting edges 96 are axially spaced above the lower terminal end of the pitting needle 82. The upper shank sections of the pitting needles are removably secured in the crosshead openings 78 by means of set screws 100. As shown in FIGURES 4 and 5, the cup cavities 40 are slotted as at 101 to receive the cutting blade edges 96, and the cup apertures 42 are slotted as at 102 to receive the end of the pitting needle 82. When used in pitting cherries, the thickness of the needle lands 90 and of the blade sections 94 is preferably .030". Although other dimensions will vary, by way of illustration, the pitting needle 82 may have a diameter of ⅜", and the slicing blade means 84 may have an overall width of 1.156". Both the pitting needle 82 and the cutting blade sections 94 may be fabricated of stainless steel.

Arranged immediately below the crosshead 74 (FIGURE 2) is a parallel stripper bar 104. Threaded into the stripper bar 104 at the opposite ends thereof are upstanding stud bolts 106 which extend through and are slidably guided in bores 108 provided in the crosshead 74. Stop nuts 110 are threaded onto the upper ends of the stud bolts 106. The foregoing mounting of the stripper bar 104 accommodates limited vertical movement of the crosshead 74 relative to the stripper bar 104. As shown in FIGURE 7, the stripper bar 104 is also provided with holes 112 and opposed slots 114 at each hole to permit the pitting needles 82 and slicing blade sections 94 to extend freely therethrough.

In the operation of the machine 10, cherries are delivered en masse to a chute (not shown) mounted on the main frame 12 adjacent the drum 24. In a conventional manner, the chute is vibrated in order to scatter the cherries throughout the width thereof so that they are delivered to the drum 24 through the length thereof. The chute delivers the cherries to the surface of the drum 24, and a revolving brush (not shown), in a conventional manner, serves to keep the cherries from piling on the surface of the drum and also aids in seating a cherry in each of the resilient cups 38.

While cherries are being fed to the drum 24, the Geneva mechanism, and the power transmission means extending thereto from the electric motor 64, serve to move the drum with an intermittent rotary movement. The cherries in two rows of the resilient cups 38 are thus carried into a position in alignment with the combined pitting and slicing instruments 80 where they are brought to rest. A cherry 116 with a pit 118 therein, positioned for pitting and slicing, is shown in dotted lines in FIGURE 5. At this time, the crosshead 74 is depressed by means of the eccentrics 68 and the arm members 70. The combined pitting and slicing instruments 80 are thus moved downwardly from the position shown in FIGURE 5 to the position shown in FIGURE 6, and are caused to act upon and enter the cherries 116 seated in the resilient cups 38. In this operation, the cutting edges 92 of the pitting needles 82 force the pits 118 through the bottom sides of the cherries 116 and through the pit discharging apertures 42 of the resilient cups 38, and the cutting edges 96 of the blade sections 94 sever the cherries into two halves. The pits 118 which pass through the pit discharging apertures 42 of the resilient cups 38 into the interior of the drum 24 are directed outwardly thereof by the trough 43.

As the crosshead 74 is raised by means of the eccentrics 68 and the arm members 70, the combined pitting and cutting instruments 80 are withdrawn from the pitted and severed cherries seated in the resilient cups 38. The stripper bar 104, under the force of gravity, remains closely adjacent the surface of the drum 24 to permit the combined pitting and cutting instruments 80 to be withdrawn from the cherries and to prevent the cherries from being carried upwardly with the instruments 80. The stripping bar 104 will remain in stripping position until the crosshead 74 engages the stop nuts 110 at which time the stripper bar 104 is caused to move upwardly with the crosshead 74. As the crosshead 74 moves toward its uppermost position, the drum 24 is rotated forwardly until cherries in the two succeeding rows of resilient cups 38 are aligned beneath the combined pitting and slicing instruments 80. Then, the crosshead 74 is again depressed, and the cycle of operation described above is repeated. The cherry halves retained in the resilient cups 38 are carried forward by the intermittent movement of the drum until approximately a half revolution is completed when they are discharged into a trough (not shown) arranged adjacent the underside of the drum 24.

In the preferred embodiment of our invention disclosed hereinabove, the use of resilient cups 38 in the drum openings 36 substantially eliminates undesirable tearing of the cherries during pitting and slicing. The resilient cups serve to cushion the cherries and prevent bruising of the fruit. Moreover, because resilient cups 38 with cavities of one size can be replaced by resilient cups with cavities of a different size, cherries of different sizes can be readily accommodated and firmly supported in order to achieve optimum quality characteristics of the finished product. By way of illustration, the cavity size for red, tart cherries is preferably 15/16" and for sweet cherries 1 1/16". Still further, because the slicing blade means 84 is releasably secured to the pitting needle 82, the slicing blade means 84 may be adjusted longitudinally of the pitting needle 82 to compensate for wear of the cutting edges of the combined pitting and cutting instruments. Whenever the ends of the pitting needles 82 are sharpened, the collar members 98 may be moved upwardly so that the desired axial distance may be maintained between the ends of the blade sections and the ends of the needles. Finally, it will be appreciated that a pitting needle having more or less than four flutes and lands may be used if desired, that the slicing blade means 84 may be provided with four blade sections 94 in the event it is desired to slice cherries into quarters, and that the slicing blade means 84 may be removed entirely if only pitting is required.

While we have shown and described what we believe to be a preferred embodiment of our present invention, it will be understood by those skilled in the art that various modifications and rearrangements may be made therein without departing from the spirit and scope of our invention.

We claim:
1. Apparatus for pitting and slicing cherries and like fruit, comprising a rotatably mounted hollow drum provided with rows of openings through said drum; resilient cups mounted in said drum openings and each being formed with a cavity to seat a cherry and with a pit discharging aperture; a plurality of combined pitting and slicing instruments each including a pitting needle and slicing blade means; said pitting needle having a longitudinally extending body portion with alternate straight flutes and narrow lands extending to one end of said pitting needle that is engageable with cherries, and inwardly inclined cutting edges formed at the ends of said lands; said slicing blade means being comprised of slicing blade sections arranged on opposite sides of said pitting needle in a plane intersecting the longitudinal axis of said pitting needle, said cutting blade sections having convex cutting edges adjacent said end of said pitting needle that is engageable with cherries, and said cutting blade sections having connection with a collar member releasably secured to said pitting needle intermediate of the ends thereof; and means causing said combined pitting and slicing instruments to act upon cherries seated in said cavities of resilient cups aligned with said instruments whereby to force the pits through the sides of the cherries and through said pit discharging apertures while severing the cherries.

2. The apparatus of claim 1 wherein said resilient cups are removable so that resilient cups with cavities of different sizes may be interchangeably mounted in said drum openings to accommodate cherries of different sizes.

3. The apparatus of claim 1 including a stripper bar having holes and opposed slots at each said hole to permit said pitting needles and slicing blade sections to extend freely therethrough, and said stripper bar being engageable with cherries that have been pitted and sliced to permit said pitting needles and slicing blade sections to be withdrawn therefrom.

4. A combined pitting and slicing instrument for cherries and like fruit, comprising a pitting needle, and slicing blade means releasably secured to said pitting needle whereby said slicing blade means may be adjusted longitudinally of said pitting needle; said pitting needle having a longitudinally extending body portion with alternate straight flutes and narrow lands extending to one end of said pitting needle that is engageable with cherries, and inwardly inclined cutting edges formed at the ends of said lands; and said slicing blade means being comprised of slicing blade sections arranged on opposite sides of said pitting needle in a plane intersecting the longitudinal axis of said pitting needle, said cutting blade sections having convex cutting edges adjacent said end of said pitting needle that is engageable with cherries, and said cutting blade sections having connection with a collar member releasably secured to said pitting needle intermediate of the ends thereof.

5. The combined pitting and slicing instrument of claim 4 in combination with a resilient cup formed with a cavity to seat a cherry and with a pit discharging aperture, said cavity being provided with slots to receive the cutting edges of said blade sections, and said aperture being provided with slots to receive the ends of said lands.

References Cited

UNITED STATES PATENTS

| | | | |
|---|---|---|---|
| 407,965 | 7/1889 | Rosassco | 146—28 |
| 1,047,786 | 12/1912 | Goldman | 146—28 |
| 2,935,104 | 5/1960 | Ashlock | 146—27 X |
| 2,133,588 | 10/1938 | Steinwand | 146—19 |
| 2,681,088 | 6/1954 | Krupp et al. | 146—17 |
| 466,453 | 1/1892 | Burns | 146—28 |
| 1,694,263 | 12/1928 | Howson | 146—19 |

W. GRAYDON ABERCROMBIE, *Primary Examiner.*

U.S. Cl. X.R.

146—42